United States Patent [19]

Mochizuki et al.

[11] Patent Number: 5,304,245
[45] Date of Patent: Apr. 19, 1994

[54] COATING COMPOSITION

[75] Inventors: Akimitsu Mochizuki; Michichika Hikosaka, both of Tokyo, Japan

[73] Assignee: Toyo Ink Manufacturing Co., Ltd., Tokyo, Japan

[21] Appl. No.: 45,948

[22] Filed: Apr. 15, 1993

[30] Foreign Application Priority Data

Apr. 17, 1992 [JP] Japan .................................. 4-124302

[51] Int. Cl.$^5$ ......................... C08K 5/42; C08K 5/07
[52] U.S. Cl. .................................................... 106/493
[58] Field of Search ......................................... 106/493

[56] References Cited

FOREIGN PATENT DOCUMENTS 0535774  4/1993  European Pat. Off. .

OTHER PUBLICATIONS

Sumitomo Chemical, Database WPIL Week 8335, Derwent Publications Ltd., AN83-750923 JP-A-58 125 758 Jul. 26, 1983.
Toyo Ink Mfg. Co., Database WPIL Week 9232, Derwent Publications Ltd. AN 92-263109 JP-A-4 178 471 Jun. 25, 1992.
Nippon Shokubai Kagaku, Database WPIL Week 8540, Derwent Publications Ltd. AN 85-247042 JP-A-60 163 836 Aug. 26, 1985.

Primary Examiner—Mark Bell
Assistant Examiner—Scott L. Hertzog
Attorney, Agent, or Firm—Wenderoth, Lind & Ponack

[57] ABSTRACT

A acid-curing coating composition which is improved in pigment dispersibility, which is free from the formation of aggregates, free from the substantial growth of a crystal and excellent in fluidity, and which gives a coating having a clear color tone and high gloss, the coating composition comprising a pigment composition containing 100 parts by weight of a pigment and 0.5 to 30 parts by weight of a sulfonic acid group-containing anthraquinone compound or its metal salt, and an acid-curing paint varnish.

8 Claims, No Drawings

COATING COMPOSITION

FIELD OF THE INVENTION

The present invention relates to a coating composition which is free from the formation of aggregates, free from the substantial growth and dislocation of a crystal and exellent in fluidity, and which gives a coating having a clear color tone and high gloss.

PRIOR ART

A coating composition containing an organic solvent causes air pollution, etc., and the organic solvent content therefore tends to be decreased. A high-solid coating composition is one typical example of coating compositions whose organic solid contents are decreased. The high-solid coating composition has excellent coating properties, e.g., excellent weatherability over conventional coating compositions, and it reportedly has excellent resistance to acid rain which has been recently taken as one of social issues. The high-solid coating composition is attracting attention as a coating composition for automobiles.

When the organic solvent content of a coating composition is decreased, the viscosity of the coating composition increases. In order to overcome this problem, the high-solid coating composition is improved by decreasing the molecular weight of a resin constituting the coating composition or by completely etherifying an amino resin. However, there arises another problem that the curing of the coating composition is slow. It is therefore required to promote the curing by adding an acid catalyst or by changing a curing catalyst to a strong acid catalyst.

An acid-curing coating composition containing an acid catalyst is poor in the stability of a dispersed pigment, and it is therefore desired to develop an effective dispersant for the pigment. A variety of pigment dispersants such as pigment derivatives have been conventionally used. A pigment derivative having a basic substituent is remarkably effective for dispersing a pigment contained in a general coating composition. However, it has been found that the pigment derivative having a basic substituent is not necessarily effective for dispersing a pigment contained in an acid-curing coating composition, since the pigment derivative and an acid catalyst mutually act on each other.

Further, JP-B-2-35786 discloses an aluminum salt of an anthraquinone derivative having a carboxyl group. However, this salt has been found to have almost no effect on improvement in pigment dispersibility.

SUMMARY OF THE INVENTION

It is an object of the present invention to provide an acid-curing coating composition which is improved in pigment dispersibility.

It is another object of the present invention to provide an acid-curing coating composition which is free from the formation of aggregates, free from the substantial growth of a crystal and excellent in fluidity.

It is further another object of the present invention to provide an acid-curing coating composition which gives a coating having a clear color tone and high gloss.

According to the present invention, the above objects and advantages of the present invention are achieved by a coating composition comprising a pigment composition containing 100 parts by weight of a pigment and 0.5 to 30 parts by weight of a sulfonic acid group-containing anthraquinone compound or its metal salt, and an acid-curing paint varnish.

The pigment used in the present invention is selected from those which do not cause any practical problem concerning the various resistances when used in a coating composition such as light resistance, weathering resistance and solvent resistance. Examples of the pigment include organic pigments such as a phthalocyanine pigment, a quinacridone pigment, an isoindolin pigment, a perylene.perinon pigment, a dioxazine pigment, a diketopyrropyrrole pigment, an anthraquinone pigment, a benzimidazolone pigment and an azo pigment and inorganic pigments such as carbon black, titanium oxide, Chrome Yellow, cadmium yellow, cadmium red, red iron oxide, black iron oxide, zinc white, iron blue and ultramarine blue. The above pigments may be used alone or in combination.

The sulfonic acid-containing anthraquinone compound used in the present invention includes a compound of the formula,

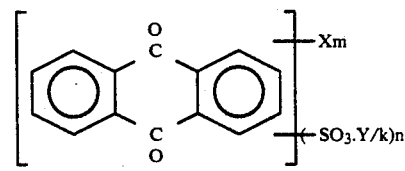

wherein X is a halogen atom, a nitro group, an amino group, a hydroxyl group or an alkyl group, Y is a hydrogen atom or a metal atom, k is a valence of Y, m is an integer of 0 to 4 and n is an integer of 1 or 2.

Specific examples of the sulfonic acid-containing anthraquinone compound include anthraquinone-1-sulfonic acid, anthraquinone-2-sulfonic acid, anthraquinone-1,5-disulfonic acid, 1-chloroanthraquinone-2-sulfonic acid, 1-nitroanthraquinone-5-sulfonic acid, 1-aminoanthraquinone-5-sulfonic acid, 1-aminoanthraquinone-2-sulfonic acid, 1,4-dihydroxyanthraquinone-2-sulfonic acid and 2-methylanthraquinone-1-sulfonic acid. Examples of the metal salt of the sulfonic acid-containing anthraquinone compound include aluminum salts, calcium salts, strontium salts and barium salts of the above sulfonic acid-containing anthraquinone compounds.

The sulfonic acid group-containing anthraquinone compound can fully serve to achieve the above objects and advantages of the present invention as far as at least one sulfone group is substituted on anthraquinone. Other substituent such as a halogen atom, a nitro group, an amino group, a hydroxyl group or an alkyl group only has a little effect on the achievement of the objects and advantages of the present invention.

The sulfonic acid group-containing anthraquinone compound in the form of a metal salt can fully serve to achieve the above objects and advantages of the present invention. In particular, a metal salt, e.g., aluminum salt, is advantageous in view of its preparation. That is, the sulfonic acid group-containing anthraquinone compound is generally prepared by introducing a sulfone group into an anthraquinone compound, placing the sulfonic acid group-containing anthraquinone compound in a large amount of water and recovering it by filtration. Since, however, the sulfonic acid group-containing anthraquinone compound has high solubility in water, the filtration takes a long time, or the yield thereof is low. The metal salt of the sulfonic acid group-containing anthraquinone compound shows decreased solubility in water, and the above problem can be overcome.

In the present invention, the amount of the sulfonic acid-containing anthraquinone compound per 100 parts by weight of the pigment is preferably 0.5 to 30 parts by weight. When this amount is less than 0.5 part by weight, there is little effect on the pigment dispersibility. When it exceeds 30 parts by weight, there can be obtained no further effect.

The coating composition of the present invention can be produced by a method in which an acid-curing paint varnish and the sulfonic acid group-containing anthraquinone compound are mixed, the mixture is dispersed with a ball mill, a sand mill, or the like, and optionally, additives such as an antisagging agent and a polymer type dispersant are added. It is preferred to prepare a preliminary paste or slurry of the pigment and the sulfonic acid-containing anthraquinone compound. In a preferred embodiment of this mixing, an aqueous solution of a sodium salt of the sulfonic acid group-containing anthraquinone compound is added to a slurry prepared by fully dispersing the pigment in water, and then water-soluble aluminum such as aluminum chloride or aluminum sulfate is added to deposit an aluminum salt of the sulfonic acid group-containing anthraquinone compound on the pigment particle surface.

When there is used a pigment which requires a process for converting it to a pigment form, e.g., solvent salt milling or dry salt milling, that is, when copper phthalocyanine, quinacridone or dioxazine is used, the sulfonic acid group-containing anthraquinone compound may be added during the process for converting it to a pigment form.

The acid-curing paint varnish used in the present invention refers to a varnish prepared by adding a solvent and an acid catalyst to a resin composition containing a hydroxyl group-containing resin as a matrix resin and an aminoaldehyde resin as a crosslinking agent.

Examples of the hydroxyl group-containing resin include a polyester polyol resin, an alkyd polyol resin, an acryl polyol resin, an epoxy polyol resin and an epoxyester polyol resin.

The polyester polyol resin is obtained by reacting a polyhydric alcohol having 2 to 6 hydroxyl groups in the molecule, a polybasic acid having 2 to 4 carboxyl groups in the molecule and optionally a monobasic acid or a monohydric alcohol in an esterification reaction. The polyhydric alcohol having 2 to 6 carboxylic acid groups in the molecule includes ethylene glycol, polyethylene glycol, neopentyl glycol, 1,6-hexanediol, pentanediol, butylene glycol, 1,5-pentanediol, trimethylolethane, trimethylolpropane, glycerin and pentaerythritol. The polybasic acid having 2 to 4 carboxylic groups in the molecule includes phthalic acid, isophthalic acid, terephthalic acid, maleic acid, methyl terephthalate, tetrahydrophthalic acid, trimellitic acid, pyromellitic acid and anhydrides of these.

The alkyd polyol resin is obtained by esterifying the above polyhydric alcohol, the above polybasic acid and either an oil fat such as castor oil, linseed oil, sunflower oil, soybean oil, corn oil, cotton seed oil, hempseed oil, rice bran oil, coconut oil or palm oil or fatty acid such as heptanoic acid, octanoic acid, nonanoic acid, decanoic acid or isostearic acid.

The acryl polyol resin is a homopolymer obtained from a hydroxyl group-containing vinyl monomer or a copolymer obtained from the above hydroxyl group-containing vinyl monomer and any one of alkyl (meth)acrylate such as methyl (meth)acrylate, ethyl (meth)acrylate and propyl (meth)acrylate, carboxyl group-containing monomers such as acrylic acid, methacrylic acid and itaconic acid, styrene monomers such as styrene and α-methylstyrene and vinyl monomers such as acrylonitrile, methacrylonitrile and vinyl acetate. The above hydroxyl group-containing vinyl monomer includes (meth)acrylic acid hydroxyesters such as hydroxyethyl (meth)acrylate and hydroxypropyl (meth)acrylate and adducts of the above (meth)acrylic acid hydroxyesters with ε-caprolactone and γ-valerolactone.

The epoxy polyol resin includes hydroxyl group-containing resins such as Epikote 828, 1001, 1004 and 1007 supplied by Shell Chemical Co.

The epoxyester polyol resin is obtained by reacting the above epoxy polyol resin with a monobasic acid or a polybasic acid.

The hydroxyl group-containing resin used in the acid-curing paint varnish used in the present invention may be prepared by modifying any one of the above polyol resins with an isocyanate compound such as tolylene diisocyanate, hexamethylene diisocyanate or isophorone diisocyanate or a silicone resin.

The above aminoaldehyde resin is obtained by reacting an amino group-containing compound and an aldehyde compound in an addition-condensation reaction or by modifying the so-obtained condensation product with an alcohol. The above amino group-containing compound includes melamine, urea, acetoguanamine, benzoguanamine, spiroguanamine and steroguanamine. The above aldehyde compound includes formaldehyde, p-formaldehyde, acetaldehyde and glyoxal. Preferred is an aminoaldehyde resin completely etherified with an alcohol having 1 to 4 carbon atoms.

Specific examples of the aminoaldehyde resin include hexamethyl etherified methylolmelamine, hexabutyl etherified methylolmelamine, methylbutyl etherified methylolmelamine, methyl etherified methylolmelamine, butyl etherified methylolmelamine and isobutyl etherified methylolmelamine.

In the resin composition used in the acid-curing paint varnish used in the present invention, the hydroxyl group-containing resin/aminoaldehyde resin mixing ratio by weight is 90/10 to 30/70.

In the resin composition used in the acid-curing paint varnish used in the present invention, the solvent is selected from ketone solvents such as methyl ethyl ketone and methyl isobutyl ketone, ester solvents such as ethyl acetate and butyl acetate, ether solvents such as dioxane and ethylene glycol diethyl ether and alcohol solvents such as butanol and propanol. These solvents may be used alone or in combination.

In the resin composition used in the acid-curing paint varnish used in the present invention, the acid catalyst is selected from sulfonic acid compounds such as p-toluenesulfonic acid, alkylbenzenesulfonic acid and alkylnaphthalenesulfonic acid, phosphoric acid compounds such as metaphosphoric acid, orthophosphoric acid, pyrophosphoric acid, tripolyphosphoric acid, phosphoric acid, trimetaphosphoric acid, triphosphoric acid, tetrametaphosphoric acid, phosphorous acid, monobutylphosphoric acid, monoethylhexylphosphoric acid and monolaurylphosphoric acid, carboxylic acid compounds such as formic acid, oxalic acid, acetic acid and lactic acid, mineral acids such as sulfuric acid and hydrochloric acid, and mineral acid salts such as ammonium chloride.

The acid-curing coating composition of the present invention is excellently free from the formation of aggregates, free from the substantial growth and dislocation of a crystal and excellent in fluidity, and which gives a coating having a clear color tone, high gloss, excellent hardness, excellent weathering resistance and excellent solvent resistance.

EXAMPLES

The present invention will be further explained hereinafter by reference to Examples, in which "part" stands for "part by weight" and "%" stand for "% by weight".

EXAMPLE 1 AND COMPARATIVE EXAMPLE 1

An acid-curing coating composition was prepared by dispersing 10 parts of C. I. Pigment Red 178 and 0.5 part of anthraquinone-2-sulfonic acid in 89.5 parts of a varnish containing polyester polyol and methyl etherified methlolmelamine as resin components and dodecylbenzenesulfonic acid as an acidic catalyst (Example 1). For comparison, an acid-curing coating composition was also prepared by dispersing 10 parts of C. I. Pigment 178 alone in 90 parts of the same varnish as above (Comparative Example 1). These acid-curing coating compositions were measured for viscosities. Table shows the results. The results in Table show that the coating composition obtained in Example 1 was excellent over the coating composition obtained in Comparative Example 1 in viscosity. Further, a coating obtained from the coating composition obtained in Example 1 was excellent in a coating obtained from the coating composition obtained in Comparative Example 1 in clearness of color tone and gloss.

Concerning the properties of being free from aggregate formation and noncrystallizability, the coating compositions were examined with regard to stability against color separation, i.e., the degree of pigment precipitation. Each coating composition was separately mixed with a base coating composition of titanium oxide such that the pigment/titanium oxide mixing ratio by weight was 1/10 to prepare tint-color coating compositions. Then, the tint-color coating compositions were diluted with butyl acetate, and each of the so-diluted coating compositions was separately placed in a test tube to observe it. As a result, the coating composition according to the present invention showed less color separation with time than the coating composition obtained in Comparative Example 1.

EXAMPLE 2

A slurry was prepared from 100 parts of C. I. Pigment Red 178, 5 parts of anthraquinone-2-sulfonic acid and 2,000 parts of water, and rendered weakly alkaline by adding sodium hydroxide. Then, the slurry was heated up to 60° C., and 4 aprts of aluminum sulfate in the form of an aqueous solution was added to convert the anthraquinone-2-sulfonic acid to aluminum salt in the co-presence of the pigment. The reaction mixture was cooled to 10° C., filtered, washed, dried and pulverized to give 105 parts of a mixture containing the pigment and aluminum anthraquinone-2-sulfonate. This mixture was dispersed in the same varnish as that used in Example 1 such that the pigment content is 10% to give an acid-curing coating composition. The so-obtained coating composition was measured for viscosities, and Table shows the results. The results in Table show that the coating composition obtained in Example 2 was excellent over the coating composition obtained in Comparative Example 1. Further, the coating composition obtained in Example 2 was excellent over the coating composition obtained in Comparative Example 1 in stability against color separation, clearness of color tone of coating and gloss of coating.

EXAMPLE 3 AND COMPARATIVE EXAMPLE 2

A slurry was prepared from 100 parts of C. I. Pigment Blue 60, 10 parts of 1-chloroanthraquinone-2-sulfonic acid and 2,000 parts of water, and rendered weakly alkaline by adding sodium hydroxide. Then, the slurry was heated up to 60° C., and 8 parts of aluminum chloride in the form of an aqueous solution was added to convert the 1-chloroanthraquinone-2-sulfonic acid to aluminum salt in the co-presence of the pigment. The reaction mixture was cooled to 10° C., filtered, washed, dried and pulverized to give 100 parts of a mixture containing the pigment and aluminum 1-chloroanthraquinone-2-sulfonate. This mixture was dispersed in the same varnish as that used in Example 1 such that the pigment content was 10%, to give an acid-curing coating composition (Example 3). For comparison, C. I. Pigment Blue 60 alone was dispersed in the same varnish as that used in Example 1 such that the pigment content was 10% to give an acid-curing coating composition (Comparative Example 2). The so-obtained coating compositions were measured for viscosities, and Table shows the results. The results in Table show that the coating composition obtained in Example 3 was excellent over the coating composition obtained in Comparative Example 2. Further, the coating composition obtained in Example 3 was excellent over the coating composition obtained in Comparative Example 2 in stability against color separation, clearness of color tone of coating and gloss of coating.

EXAMPLES 4–15 AND COMPARATIVE EXAMPLES 3–12

In each Example, a pigment shown in Table and a sulfonic acid compound shown in Table were dispersed in the same varnish as that used in Example 1 such that the pigment content was 10% to give an acid-curing coating composition. In each Comparative Example, only a pigment shown in Table was dispersed in the same varnish as that used in Example 1 such that the pigment content was 10% to give an acid-curing coating composition. The so-obtained coating compositions were measured for viscosities, and Table shows the results. The results in Table show that the coating composition according to the present invention is excellent over the comparative coating composition. Further, the coating compositions obtained according to the present invention were excellent over the comparative coating compositions in stability against color separation, clearness of color tone of coating and gloss of coating.

TABLE

| | Pigment | Sulfonic acid-containing anthraquinone compound (%) | Viscosity (cps) | | | |
|---|---|---|---|---|---|---|
| | | | 6 rpm | 12 rpm | 30 rpm | 60 rpm |
| CEx. 1 | C.I. Pigment | — (0) | 3,460 | 1,760 | 980 | 600 |

TABLE-continued

| | Pigment | Sulfonic acid-containing anthraquinone compound (%) | | Viscosity (cps) | | | |
|---|---|---|---|---|---|---|---|
| | | | | 6 rpm | 12 rpm | 30 rpm | 60 rpm |
| Ex. 1 | C.I. Pigment Red 178 | Anthraquinone-2-sulfonic acid | (5) | 120 | 120 | 110 | 100 |
| Ex. 2 | C.I. Pigment Red 178 | Aluminum anthraquinone 2-sulfonate | (5) | 110 | 110 | 100 | 100 |
| CEx. 2 | C.I. Pigment Blue 60 | — | (0) | 2,380 | 1,200 | 760 | 460 |
| Ex. 3 | C.I. Pigment Blue 60 | Aluminum 1-chloro-anthraquinone-2-sulfonate | (10) | 140 | 120 | 120 | 120 |
| Ex. 4 | C.I. Pigment Blue 60 | Anthraquinone-1,5-disulfonic acid | (5) | 260 | 160 | 140 | 140 |
| CEx. 3 | C.I. Pigment Blue 15:1 | — | (0) | 2,800 | 1,380 | 860 | 500 |
| Ex. 5 | C.I. Pigment Blue 15:1 | Anthraquinone-2-sulfonic acid | (10) | 110 | 110 | 110 | 110 |
| CEx. 4 | C.I. Pigment Violet 19 | — | (0) | 4,920 | 2,240 | 1,400 | 880 |
| Ex. 6 | C.I. Pigment Violet 19 | Anthraquinone-2-sulfonic acid | (10) | 100 | 100 | 100 | 100 |
| CEx. 5 | C.I. Pigment Violet 23 | — | (0) | 3,240 | 1,640 | 960 | 580 |
| Ex. 7 | C.I. Pigment Violet 23 | 1-aminoanthraquinone-2-sulfonic acid | (10) | 80 | 80 | 80 | 80 |
| CEx. 6 | C.I. Pigment Yellow 108 | — | (0) | 3,520 | 1,740 | 940 | 620 |
| Ex. 8 | C.I. Pigment Yellow 108 | Calcium anthraquinone-2-sulfonic acid | (20) | 460 | 360 | 300 | 260 |
| CEx. 7 | C.I. Pigment Yellow 110 | — | (0) | 1,840 | 1,000 | 760 | 660 |
| Ex. 9 | C.I. Pigment Yellow 110 | Anthraquinone-2-sulfonic acid | (10) | 520 | 400 | 320 | 300 |
| CEx. 8 | C.I. Pigment Orange 43 | — | (0) | 3,300 | 1,640 | 960 | 560 |
| Ex. 10 | C.I. Pigment Orange 43 | 2-Methylanthraquinone-1-sulfonic acid | (10) | 320 | 260 | 200 | 200 |
| CEx. 9 | C.I. Pigment Red 5 | — | (0) | 2,660 | 1,240 | 800 | 480 |
| Ex. 11 | C.I. Pigment Red 5 | 1-nitroanthraquinone-2-sulfonic acid | (20) | 140 | 120 | 120 | 120 |
| CEx. 10 | C.I. Pigment Red 101 | — | (0) | 280 | 250 | 220 | 200 |
| Ex. 12 | C.I. Pigment Red 101 | Anthraquinone-2-sulfonic acid | (5) | 80 | 80 | 80 | 80 |
| CEx. 11 | C.I. Pigment Red 176 | — | (0) | 3,640 | 1,820 | 980 | 620 |
| Ex. 13 | | Anthraquinone-2-sulfonic acid | (10) | 260 | 240 | 220 | 200 |
| CEx. 12 | C.I. Pigment Red 254 | — | (0) | 1,840 | 940 | 600 | 420 |
| Ex. 14 | C.I. Pigment Red 254 | Anthraquinone-2-sulfonic acid | (15) | 300 | 220 | 180 | 160 |
| Ex. 15 | C.I. Pigment Red 254 | 1,4-dihydroxy-anthraquinone-2-sulfonic acid | (15) | 200 | 180 | 160 | 160 |

What is claimed is:

1. A coating composition comprising a pigment composition containing 100 parts by weight of a pigment and 0.5 to 30 parts by weight of a sulfonic acid group-containing anthraquinone compound or its metal salt, and an acid-curing paint varnish.

2. A coating composition according to claim 1, wherein the pigment is an organic pigment and/or an inorganic pigment.

3. A coating composition according to claim 1, wherein the sulfonic acid group-containing anthraquinone compound or its metal salt has the formula,

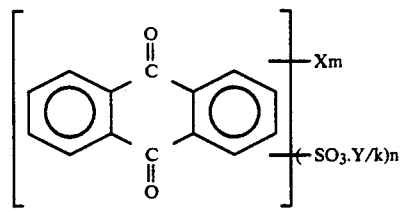

X is a halogen atom, a nitro group, an amino group, a hydroxyl group or an alkyl group, Y is a hydrogen atom or a metal atom, k is a valence of Y, m is an integer of 0 to 4 and n is an integer of 1 or 2.

4. A coating composition according to claim 1, wherein the acid-curing paint varnish comprises a resin composition containing a hydroxyl group-containing resin as a matrix resin and an aminoaldehyde resin as a crosslinking agent, a solvent and an acid catalyst.

5. A coating composition according to claim 4, wherein the hydroxyl group-containing resin is at least one member selected from the group consisting of a polyester polyol resin, an alkyd polyol resin, an acryl polyol resin, an epoxy polyol resin and an epoxy ester polyol resin.

6. A coating composition according to claim 4, wherein the hydroxyl group-containing resin and the aminoaldehyde resin are contained in a hydroxyl group-containing resin/aminoaldehyde resin mixing ratio of 90/10 to 30/70 by weight.

7. A coating composition according to claim 4, wherein the solvent is at least one member selected from the group consisting of a hydrocarbon, a ketone, an ester, an ether and an alcohol.

8. A coating composition according to claim 4, wherein the acid catalyst is at least one member selected from the group consisting of a sulfonic acid compound, a phosphoric acid compound, a carboxylic acid compound, an inorganic acid and an inorganic acid salt.

* * * * *